United States Patent
Kwak et al.

(10) Patent No.: US 11,084,900 B2
(45) Date of Patent: Aug. 10, 2021

(54) POLYESTER SINGLE LAYER FILM

(71) Applicant: SKC CO., LTD., Gyeonggi-do (KR)

(72) Inventors: Ki-Yuel Kwak, Gyeonggi-do (KR); Jung Kyu Lee, Gyeonggi-do (KR); Seungwon Lee, Gyeonggi-do (KR); Hojin Yu, Seoul (KR)

(73) Assignee: SKC CO., LTD., Gyeonggi-do (KR)

( * ) Notice: Subject to any disclaimer, the term of this patent is extended or adjusted under 35 U.S.C. 154(b) by 371 days.

(21) Appl. No.: 16/310,348

(22) PCT Filed: Jun. 14, 2017

(86) PCT No.: PCT/KR2017/006178
§ 371 (c)(1),
(2) Date: Dec. 14, 2018

(87) PCT Pub. No.: WO2017/217754
PCT Pub. Date: Dec. 21, 2017

(65) Prior Publication Data
US 2019/0322798 A1    Oct. 24, 2019

(30) Foreign Application Priority Data

Jun. 17, 2016 (KR) .................. 10-2016-0076053

(51) Int. Cl.
| | |
|---|---|
| *C08G 63/183* | (2006.01) |
| *C08G 63/86* | (2006.01) |
| *C08J 5/18* | (2006.01) |
| *C08J 7/06* | (2006.01) |
| *G02B 1/04* | (2006.01) |
| *H01B 3/42* | (2006.01) |
| *H01B 5/14* | (2006.01) |
| *C08J 7/043* | (2020.01) |
| *C08J 7/044* | (2020.01) |

(52) U.S. Cl.
CPC ......... *C08G 63/183* (2013.01); *C08G 63/863* (2013.01); *C08J 5/18* (2013.01); *C08J 7/043* (2020.01); *C08J 7/044* (2020.01); *C08J 7/06* (2013.01); *G02B 1/04* (2013.01); *H01B 3/421* (2013.01); *H01B 5/14* (2013.01); *C08J 2367/02* (2013.01)

(58) Field of Classification Search
USPC ...................... 428/480, 411.1, 412
See application file for complete search history.

(56) References Cited

FOREIGN PATENT DOCUMENTS

| | | | |
|---|---|---|---|
| EP | 1639034 | 1/2010 | |
| JP | 2002249561 | 9/2002 | |
| JP | 2003306541 | 10/2003 | |
| JP | 2004083737 | 3/2004 | |
| JP | 2007-112853 A | 5/2007 | |
| JP | 2011-011371 A | 1/2011 | |
| JP | 2015074169 | 4/2015 | |
| JP | 2015074169 A | * 4/2015 | ........... B29C 48/832 |
| KR | 1020160002196 | 1/2016 | |
| KR | 1020160021822 | 2/2016 | |

OTHER PUBLICATIONS

Kubo Koji et al. JP02015074169A Method for Producing Polyester Resin Molded Product (Year: 2015).*
Office Action issued by the Korean Intellectual Property Office dated Apr. 18, 2017.
Office Action issued by Japanese Patent dated Jan. 21, 2020.

* cited by examiner

*Primary Examiner* — Terressa Boykin
(74) *Attorney, Agent, or Firm* — IP & T Group LLP

(57) ABSTRACT

A polyester single layer film according to an embodiment of the present invention has low haze and low oligomer characteristics, has a more bluish color coordinate, and has a low inorganic metal content. Accordingly, the polyester single layer film may be used as a base film of a heat-resistant protective film and a light-scattering preventive film, as well as an ITO and non-ITO base film (for Ag nanowire, or the like) used in recent touch panels. In addition, since the transmittance at a wavelength of 550 nm is relatively high due to less impurity, the polyester single layer film may be used as a base film of a prism for a backlight unit (BLU) and a diffusion sheet.

10 Claims, No Drawings

POLYESTER SINGLE LAYER FILM

This application is a national stage application of PCT/KR2017/006178 filed on Jun. 14, 2017, which claims priority of Korean patent application number 10-2016-0076053 filed on Jun. 17, 2016 and which has issued as Korean patent number 1801919 on Nov. 21, 2017. The disclosure of each of the foregoing applications is incorporated herein by reference in its entirety.

TECHNICAL FIELD

The present invention relates to a polyester single layer film having a low oligomer content and a low haze.

BACKGROUND ART

Generally, polyester films are used for not only display devices but also various kinds of industrial materials such as containers for filling beverage and medical treatment, packaging materials, sheets, and molded products in automobile. Among them, in case of a plasma display panel (PDP) or a liquid crystal display (LCD), which occupies most of the display industry, a plastic film is widely used as a component of a device. In such case, when optical transparency is required, a polyester film is used, and when durability and heat resistance are required, a polyimide film is mainly used. In particular, biaxially stretched polyester films are excellent in dimensional stability, thickness uniformity and optical transparency and, thus, are used in various industrial fields.

Base films used in such display fields are required to have various characteristics such as process stability, transparency, scratch resistance, planarity, and light transmittance in order to improve the ease of manufacturing processes and the visibility of manufactured products.

In order to satisfy the above-described characteristics, Korean Laid-Open Patent Publication No. 2016-0002196 discloses a polyester film having a hard coating layer formed on one side and a transparent conductive film using same. This polyester film does not generate rainbow phenomenon, prevents the migration of oligomers in the film to the surface, and shows excellent adhesion under high temperature and high humidity to attain excellent adhesion to a transparent electrode layer and excellent optical properties.

DISCLOSURE OF INVENTION

Technical Problem

In Korean Laid-Open Patent Publication No. 2016-0002196 and conventional polyester polymerization, an antimony (Sb) compound was mainly used as a catalyst, and in this case, improvement of the haze of a produced polyester film was limited. Further, in order to secure trafficability properties, a filler should be added to a polyester resin. However, there was a problem that the haze of the film was increased due to scattering by the filler.

An object of the present invention is to provide a polyester single layer film having low haze, low oligomer properties and a low inorganic metal content, and having a more bluish color coordinate as compared with a polyester film using an antimony catalyst.

Solution to Problem

According to an aspect of the present invention, there is provided a polyester single layer film comprising a polyester resin prepared by using a germanium compound as a catalyst, which has a haze of 0.5% or less and shows a haze change rate of 1% or less when heat-treated at 150° C. for 3 hours.

According to another aspect of the present invention, there is provided a conductive film comprising the above polyester single layer film and an indium tin oxide (ITO)-based conductive layer which is formed on one side of the polyester single layer film, in a laminated form, wherein the conductive film does not comprise a hard coating layer.

According to a further aspect of the present invention, there are provided a heat-resistant protective film, a light-scattering preventive film, and an optical sheet comprising the above polyester single layer.

Advantageous Effects of Invention

The polyester single layer film according to an embodiment of the present invention has low haze and low oligomer properties, has a more bluish color coordinate, and has a low inorganic metal content. Accordingly, the polyester single layer film may be used as a base film of a heat-resistant protective film and a light-scattering preventive film, as well as an ITO and non-ITO base film (for Ag nanowire, or the like) used in recent touch panels. In addition, since the transmittance at a wavelength of 550 nm is relatively high due to less impurity, the polyester single layer film may be used as a base film of a prism for a backlight unit (BLU) and a diffusion sheet. Further, if the polyester single layer film is used as a base film, the process of preparing a hard coating layer may be omitted and more economical and easier manufacturing may be possible.

BEST MODE FOR CARRYING OUT THE INVENTION

The polyester single layer film according to an embodiment of the present invention includes a polyester resin prepared by using a germanium compound as a catalyst, has a haze of 0.5% or less and shows a haze change rate of 1% or less when heat-treated at 150° C. for 3 hours.

The polyester resin may be formed by a germanium compound catalyst. That is, the polyester resin may be formed by reacting a diol component and a dicarboxylic acid component in the presence of a germanium compound catalyst.

The polyester resin may be polyethylene terephthalate. Specifically, the polyester resin may be polyethylene terephthalate obtained by performing a transesterification reaction of ethylene glycol and terephthalic acid while using a germanium compound as a catalyst and then polymerization.

The polyester resin may have an intrinsic viscosity (IV) of 0.6 to 0.8 dl/gr. Specifically, the polyester resin may have an intrinsic viscosity (IV) of 0.65 to 0.75 dl/gr.

The polyester resin may be prepared by a solid phase polymerization process. For example, a melt-polymerized polyester resin may be made in the form of a pellet, crystallized at 150 to 200° C., and then polymerized at 200 to 230° C.

The germanium compound may be (A) amorphous germanium oxide, (B) fine crystalline germanium oxide, (C) a solution obtained by dissolving germanium oxide in glycol in the presence of an alkali metal, alkaline earth metal, or a compound thereof, and (D) a solution obtained by dissolving germanium oxide in water. Specifically, a germanium compound usable as a catalyst (germanium-based catalyst) may be germanium oxide. In addition, the germanium-based catalyst may be included in an amount of 10 to 10,000 ppm, specifically 10 to 1,000 ppm, based on the total weight of the polyester resin. If the catalyst is used in an amount within the above range, the polycondensation reaction of the polyester resin is effectively carried out, and color degradation of the polyester resin may be prevented. Further, it may be economical from the viewpoint of the effect on the amount of the catalyst used, and the catalyst may not remain.

The polyester single layer film may include an inorganic metal of 100 ppm or less, and the inorganic metal may not include silicon (Si). Specifically, the polyester single layer film may include an inorganic metal of 40 to 100 ppm.

The polyester single layer film may show a haze change rate of 2% or less when heat-treated at 150° C. for 9 hours. Specifically, the polyester single layer film may show a haze change rate of 1 to 2% when heat-treated at 150° C. for 9 hours.

The polyester single layer film may not include an applicator component selected from the group consisting of magnesium and potassium.

The polyester single layer film may include 100 ppm or less of an inorganic metal. Specifically, the polyester single layer film may include 40 to 100 ppm of an inorganic metal, and may not include an applicator component selected from the group consisting of magnesium and potassium.

The polyester single layer film may include a total oligomer in an amount of 0.5 to 2.2% by weight when measured by being dissolved in trifluoroacetic acid. Specifically, the total oligomer may be included in an amount of 0.8 to 2.0% by weight.

The polyester single layer film may have an average thickness of 15 to 250 μm. Specifically, the polyester single layer film may have an average thickness of 25 to 200 μm.

The polyester single layer film may be prepared by melt-extruding the polyester resin and then cooling to produce a non-oriented sheet, and then uniaxially or biaxially orienting and heat-setting the non-oriented sheet.

The melt extrusion may be performed at a temperature of Tm+30 to Tm+60° C. When the melt extrusion process is performed within the range, the viscosity of the extruded product is appropriately controlled due to smooth melting of the resin, thereby preventing the problem of poor productivity, and thermal decomposition of the resin. Accordingly, reduction of the molecular weight of the resin due to the problems of depolymerization and defects due to oligomers may be prevented.

The cooling may be performed at a temperature of 30° C. or less, and specifically, at 10 to 30° C.

The non-oriented sheet may be oriented by a suitable drawing ratio in the length direction (machine direction) and the width direction (tenter direction). For example, the non-oriented sheet may be drawn 2 to 6 times in the length direction and 2 to 6 times in the width direction. Specifically, the non-oriented sheet may be drawn 2 to 4 times in the length direction and 2 to 4 times in the width direction. Further, the length direction and the width direction may be perpendicular to each other.

The drawing may be performed at Tg+5 to Tg+50° C. As Tg decreases, the drawing properties may become better, but the fracture may occur. Specifically, in order to improve the brittleness of the film, the drawing may be conducted at Tg+10 to Tg+40° C.

The heat setting is performed to relax the film in the length direction and the width direction. Specifically, the heat setting may be performed at 120 to 260° C.

An embodiment of the present invention provides a conductive film including the above-mentioned polyester single layer film and an indium tin oxide (ITO)-based conductive layer, which is formed on one side of the polyester single layer film, in a laminated form, wherein the conductive film does not include a hard coating layer.

On the polyester single layer film, a hard coating layer may not be formed, but an ITO-based conductive layer may be formed.

For example, an ITO-based conductive layer may not be directly formed on the polyester single layer film. More specifically, the polyester single layer film and the ITO-based conductive layer may make direct contact from each other.

For example, after laminating at least one layer selected from the group consisting of a primer layer and a refractive index matching layer on the polyester single layer film, the ITO-based conductive layer may be formed. Specifically, a primer layer and an ITO-based conductive layer may be sequentially laminated on the polyester single layer film. Accordingly, the primer layer may make direct contact with one side of the polyester single layer film, and the ITO-based conductive layer may make direct contact with the other side of the primer layer. Further, in more detail, a refractive index matching layer and an ITO-based conductive layer may be sequentially laminated on the polyester single layer film. Accordingly, the refractive index matching layer may make direct contact with one side of the polyester single layer film, and the ITO-based conductive layer may make direct contact with the other side of the refractive index matching layer. Furthermore, in more detail, a primer layer, a refractive index matching layer, and an ITO-based conductive layer may be sequentially laminated on the polyester single layer film. Accordingly, the primer layer may make direct contact with one side of the polyester film, the refractive index matching layer may make direct contact with the other side of the primer layer, and the ITO-based conductive layer may make direct contact with the other side of the refractive index matching layer.

The primer layer may improve adhesion between the polyester single layer film and another layer. The primer layer may include a polyester-based resin and/or a urethane-based resin.

The refractive index matching layer may buffer a refractive index difference between the polyester single layer film and the ITO-based conductive layer. The refractive index of the refractive index matching layer may be a value between the refractive index of the polyester single layer film and the refractive index of the ITO-based conductive layer.

Since the conductive film does not include a hard coating layer, the manufacturing cost is low.

An embodiment of the present invention provides a heat-resistant protective film, a light-scattering preventive film, and an optical sheet each including the above-mentioned polyester single layer film.

A polyester single layer film according to an embodiment of the present invention has low haze and low oligomer characteristics, has a more bluish color coordinate, and has a low inorganic metal content. Accordingly, the polyester single layer film may be used as a base film of a heat-resistant protective film and a light-scattering preventive film, as well as an ITO and non-ITO base film (for Ag nanowire or the like) used in recent touch panels. In addition, since the transmittance at a wavelength of 550 nm is relatively high due to less impurity, the polyester single layer film may be used as a base film of a prism for a backlight unit (BLU) and a diffusion sheet. Further, if the polyester single layer film is used as the base film, the process of preparing a hard coating layer may be omitted, and more economical and easier manufacturing may be possible.

MODE FOR THE INVENTION

Hereinafter, the present invention is explained in more detail referring to examples. The following examples are intended to further illustrate the present invention without limiting its scope.

Example 1. Preparation of Polyester Film

The temperature of an esterification reaction tube was elevated to 200° C., 100 mol % of ethylene glycol and 100 mol % of terephthalic acid were added thereto, and 0.017 parts by weight of a germanium dioxide compound based on 100 parts by weight of the above materials was added as a catalyst, followed by stirring. Then, a pressurized esterification reaction was carried out by applying pressure and elevating temperature under the conditions of a gauge pressure of 0.34 MPa and 240° C., the pressure of the esterification reaction tube was returned to a normal pressure, and 0.014 parts by weight of phosphoric acid was added. Thereafter, the temperature was elevated to 260° C. over 15 minutes, and 0.012 parts by weight of trimethyl phosphate was added as a stabilizer. Then, after 15 minutes, dispersion treatment was performed with a high-pressure disperser, and after 15 minutes again, the esterification reaction product thus obtained was transferred to a polycondensation reaction tube, and polycondensation reaction was carried out at 280° C. under a reduced pressure for 1 hour to obtain a polyester resin (intrinsic viscosity: 0.7 dl/g, weight average molecular weight: 45,000, glass transition temperature: 80° C.).

After completing the polycondensation reaction, the polyester resin was filtered with a NASLON filter of which 95% cut size was 5 μm and extruded from nozzles into a strand shape, and cooled and solidified using cooling water which was previously filter-treated (hole size: 1 μm or less), and cut into a pellet shape to produce polyester resin chips.

The polyester resin chips were melt-extruded through an extruder at 280° C. and then cooled on a casting roll at 20° C. to prepare a non-oriented sheet. The non-oriented sheet thus obtained was preheated to 78° C. and drawn 3.2 times in the length direction and 4.1 times in the width direction. Thereafter, the oriented sheet was heat set at 238° C. for 30 seconds to produce a polyester film having a thickness of 125 plm.

Comparative Example 1

A polyester film having a thickness of 125 μm was prepared in the same manner as in Example 1 except that 0.035 parts by weight of antimony was used instead of a germanium compound based on 100 parts by weight of the materials and an applicator including magnesium and potassium was used.

Comparative Example 2

A polyester film having a thickness of 125 μm was prepared in the same manner as in Comparative Example 1 except that 0.019 parts by weight of antimony was used instead of a germanium compound based on 100 parts by weight of the materials and an applicator including magnesium and potassium was used.

Experimental Example

According to the methods below, the component content in each resin chip, the color b of a resin chip, the color angle of a film, the total oligomer content of the film, the haze change of a film after being left at a high temperature were measured with regard to the polyester films of Example 1 and Comparative Examples 1 and 2. The results are shown in Table 1.

(1) Component Content in Resin Chip

The content of each component of a polyester resin chip was measured by a method for qualitative and quantitative analysis of inorganic metal components through inductively coupled plasma (ICP) atomic emission spectrometer analysis.

(2) Color of Resin Chip

The color of a polyester resin chip was measured by using a spectrophotometer (Nippon Denshoku, SE2000) based on methods of ASTM D 1925, ASTM E 308, and JIS Z 8722.

(3) Haze of Film and Haze of Film after being Left at High Temperature

In order to determine the haze change of a film, a polyester film was heat-treated in an oven at 150° C. for 3 hours or 9 hours, and haze was measured by using a haze meter (Nippon Denshoku Kogyo, model name: NDH-5000W). The haze of the polyester film before heat treatment was also measured by the same method.

(4) Color of Film

The CIE colorimetric systems col Y, x and y of a polyester film were measured using a color meter (manufacturer: Hunter Lab, model name: UltraScan PRO).

(5) Total Oligomer Content of Film 1 g of a polyester film was put in 10 ml of trifluoroacetic acid, and dissolved at room temperature with stirring. Then, the trifluoroacetic acid in which the film was dissolved was cooled to about 0° C., and 20 ml of chloroform was slowly added drop by drop. Then, 20 ml of water, 5 ml of acetone, and 12 ml of aqueous ammonia were sequentially and slowly added in the same manner as the chloroform. Then, filtering was performed and chloroform containing oligomers was extracted using a separatory funnel. Then, the chloroform containing the oligomer was heated to 53° C. and the solution was evaporated while blowing nitrogen gas, dried at 105° C. for 1 hour, and then cooled for 30 minutes in a desiccator. Weights before and after the evaporation and drying of the solution were measured, and a difference between before and after the evaporation and drying was calculated as an oligomer content (%).

TABLE 1

|  |  | Example 1 | Comparative Example 1 | Comparative Example 2 |
|---|---|---|---|---|
| Content of Component (ppm) | Ge | 50 | — | — |
|  | Sb | — | 440 | 250 |
|  | P | 70 | 75 | 75 |
|  | Mg | — | 70 | 70 |
|  | K | — | 10 | 10 |
| Color b of resin chip |  | 1 | 6 | 3.7 |
| Color of film (col. y) |  | 0.3309 | 0.3311 | 0.3311 |
| Haze of film |  | 0.3% | 0.9% | 0.8% |
| Total oligomer content of film |  | 1.02% | 2.23% | 2.15% |
| Haze change after heat treatment at 150° C. for 3 hours |  | 0.9% | 15.3% | 19.8% |
| Haze change after heat treatment at 150° C. for 9 hours |  | 1.1% | 20.7% | 21.1% |

As shown in Table 1, since the polyester resin chip of Example 1 did not include magnesium and potassium, which are applicators, the inorganic metal content was low. In addition, in Example 1, the haze and total oligomer content of the film were low, and the haze was maintained low even after heat treatment at 150° C. for 3 or 9 hours when compared with Comparative Examples 1 and 2. Furthermore, the film of Example 1 was more bluish than those of Comparative Examples 1 and 2.

The invention claimed is:

1. A polyester single layer film comprising a polyester resin prepared by using a germanium compound as a catalyst, wherein the polyester single layer film has a haze of 0.5% or less and shows a haze change rate of 1% or less when heat-treated at 150° C. for 3 hours, and
   wherein the polyester single layer film comprises an inorganic metal of 100 ppm or less, and does not comprise an applicator component selected from the group consisting of magnesium and potassium.

2. The polyester single layer film of claim 1, wherein the inorganic metal does not comprise silicon.

3. The polyester single layer film of claim 1, wherein the polyester single layer film shows a haze change rate of 2% or less when heat-treated at 150° C. for 9 hours.

4. The polyester single layer film of claim 1, wherein the polyester resin is polyethylene terephthalate.

5. The polyester single layer film of claim 1, wherein the polyester resin has an intrinsic viscosity (IV) of 0.6 to 0.8 dl/gr.

6. The polyester single layer film of claim 1, wherein the polyester single layer film comprises a total oligomer in an amount of 0.5 to 2.2% by weight when measured by being dissolved in trifluoroacetic acid.

7. A conductive film, comprising:
   the polyester single layer film according to claim 1; and
   an indium tin oxide (ITO)-based conductive layer, which is formed on one side of the polyester single layer film, in a laminated form,
   wherein the conducive layer does not comprise a hard coating layer.

8. A heat-resistant protective film comprising the polyester single layer film according to claim 1.

9. A light-scattering preventive film comprising the polyester single layer film according to claim 1.

10. An optical sheet comprising the polyester single layer film according to claim 1.

* * * * *